Nov. 21, 1933.  G. F. STACK  1,936,100
WATCH HOLDER
Filed Feb. 29, 1932
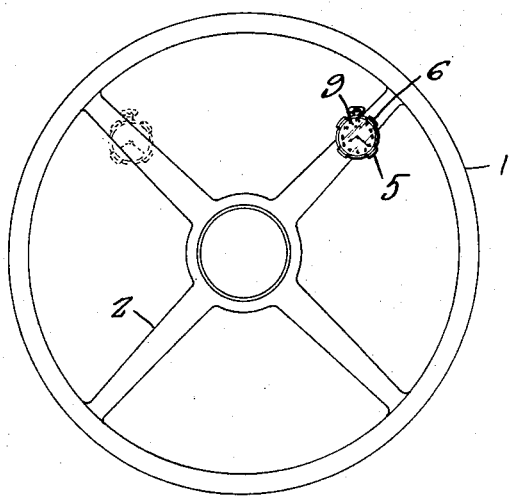
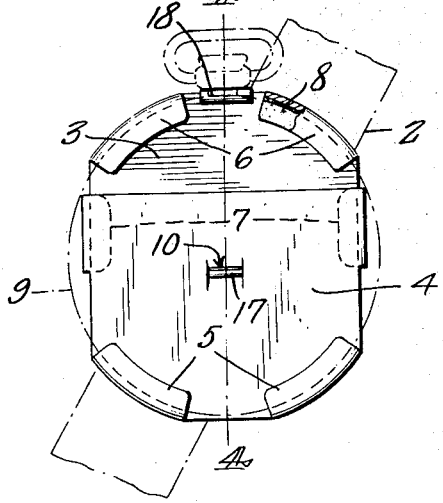
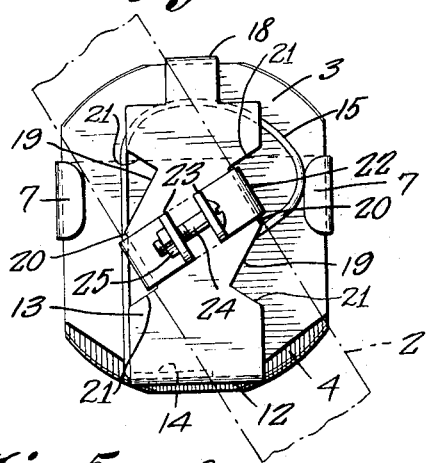
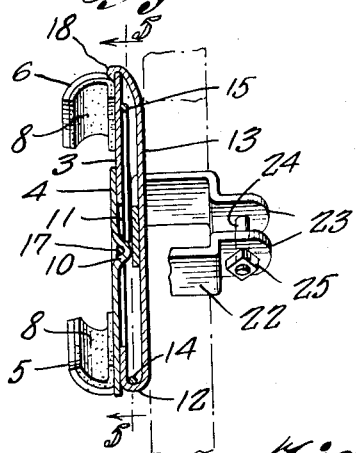
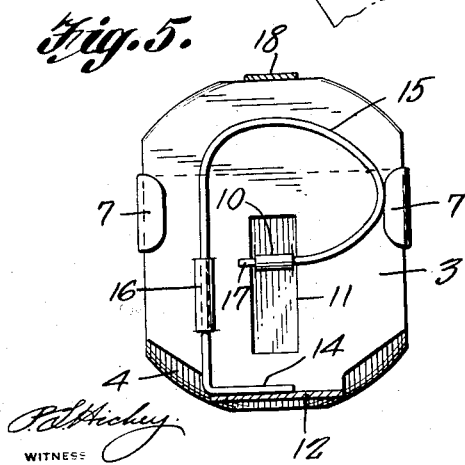
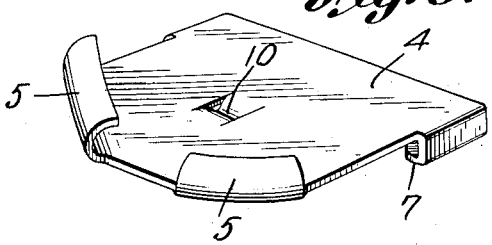
George F. Stack,
INVENTOR
BY Victor J. Evans & Co.
ATTORNEY Patented Nov. 21, 1933

1,936,100

UNITED STATES PATENT OFFICE 1,936,100

WATCH HOLDER

George F. Stack, Washington, D. C.

Application February 29, 1932. Serial No. 595,945

6 Claims. (Cl. 224—4)

My present invention has reference to a device for effectively holding a watch clamped on a spoke of the steering wheel of an automobile in an easy and thoroughly effective manner and without liability of inflecting injury to the time piece or marring the spoke.

A further and important object is the provision of a holder for this purpose which is adjustable to clamp thereon time pieces of various sizes and which is provided with means for easily, quickly and effectively securing the same on the spoke of a steering wheel for automobiles so that the watch or like time piece can be correctly observed regardless of the angular relation of the spoke with respect to the driver of the automobile.

A still further object is the provision of an adjustable holder for watches and means removably and adjustably associated with the wheel for clamping and locking the holder on a spoke of a steering wheel of an automobile, so that the time piece will be retained in proper reading position regardless of the angular relation of the spokes with respect to the steering wheel when the latter is in a position to direct the automobile straight ahead.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claims.

In the drawing:

Figure 1 is a plan view of an automobile steering wheel illustrating my improvement applied thereon.

Figure 2 is a top plan view of the improvement with the time piece removed.

Figure 3 is a rear elevation thereof.

Figure 4 is a sectional view approximately on the line 4—4 of Figure 2.

Figure 5 is a sectional view approximately on the line 5—5 of Figure 4 looking in the direction of the arrows.

Figure 6 is a perspective view of the slidable clamping plate.

As is well known to those acquainted with automobiles the spokes between the center and rim of the steering wheels are arranged at various angles of inclination and consequently it has heretofore been found extremely difficult to clamp a watch or like time piece on one of such spokes in a manner whereby the time piece will be arranged for perfect reading by the driver of the automobile when the machine is being steered straight ahead. This difficulty is successfully overcome by my simple invention.

Referring now to the drawing in detail the numeral 1 designates the steering wheel of any ordinary type of automobile and 2 the spokes which radiate from the center or hub of the wheel to the outer periphery or rim thereof. On one of the upper or preferably right hand spokes 2 I removably secure my improved watch holder. The holder essentially comprises two plates, one arranged over the other. The plates are small in size and preferably have their bodies of rectangular formation but the outer corners of these plates are rounded and the said rounded portions are formed with upwardly and inwardly extending gripping fingers.

The underlying, and what I will term the fixed plate is indicated by the numeral 3 and the overlying and slidable plate by the numeral 4.

The clamping fingers on the slidable plate are indicated by the numeral 5 and those on the fixed plate 3 by the numeral 6. The slidable plate 4 has its edges, from its straight and non-fingered end formed with ears which are bent against the edges and under the fixed plate 3 to provide guides 7.

The arcuately arranged curved fingers 5 have on their inner faces compressible strips 8 which are also arranged over the outer faces of the said plates 3 and 4 but these last portions of the strips are preferably covered by the overlying parts of the fingers 5 and 6. The compressible elements 8 afford cushioning elements for a watch 9 which is received over and clamped on the plates. The plate 4 is centrally slitted longitudinally at points equidistant from the center thereof and the metal bounded by these slits is bent rearwardly and rounded to provide what I will term a somewhat elongated eye 10. The eye passes through a central and substantially rectangular opening 11 in the fixed plate 3 and, if desired, the ends of the eye may be in slight contact with the opposed side walls provided by the opening 11.

What is normally the lower end of the fixed plate 3, or the end thereof opposite that provided with the gripping fingers 6 has its corners cut angularly and between the said corners the plate is formed with a part 12 which is bent upon itself to provide a tongue 13 that underlies the said plate 3. The bent portion 12 of the tongue 13 affords a rest for the straight end 14 of a spring wire 15. The wire is guided through an eye 16 provided on the rear or under face of the plate 3 and has its outer end rounded upon itself and passed through the eye 10. The end of the spring that passes through the eye is indicated by the numeral 17 and the end 17 is designed to contact with the rear face of the plate 3 at the opposite sides of the opening 11 and to also exert an outward pressure away from the plate so that the spring wire 15 not only serves as a means for causing the plate 4 to slide over the plate 3 in the direction of the fingers 6 but also holds the plate 4 firmly against the plate 3, and obviously the plate 4 is moved against the tension of the spring 15 outwardly with respect to the plate 3 before the watch 9 is arranged between the plates and held thereon by the clamping fingers 5 and 6.

The tongue 13 has its free end formed with a reduced extension that merges into a catch 18 which is designed to slip over and to engage with the outer face of the plate 3 between the fingers 6 when the tongue is to be latched to the plate. The catch 18 is really in the nature of a bendable part and is designed to be compressed against the outer face of the plate 3 for rigidly holding the tongue 13 on the plate and for preventing any vibration of the device when attached to the spoke 2.

The tongue 13 is notched from its opposite edges to afford the said tongue with oppositely disposed angularly arranged and parallel walls 19—19 and 20—20 and likewise with angle walls 21 at the terminal of the said walls 19—19 and 20—20. The notches are of substantially W-shaped formation, except as stated, the angle walls 19 and 20 provided by the notches at each edge of the tongue are arranged in parallelism with each other. This is an important feature of the invention, as two of the opposed angularly arranged and parallel walls 19—19 and 20—20 are designed to be contacted by the inner sides of a spring metal clip 22. The body of the clip is of the usual substantially rectangular formation and its outer split ends are bent to form the same with parallel ears 23 between which ears there is passed a bolt 24 that is engaged by a suitable nut 25. The clip 22 is arranged to surround the spoke 2 and is clamped thereon by the screw 24 only after the holder and its tongue have been properly arranged to sustain the watch 9 in reading position by the driver when the automobile is being driven straight ahead.

My improvement it will be noted is of a simple construction which may be cheaply manufactured and commercialized. The holder may easily and quickly clamp a watch thereon. The spring 15 effectively holds the watch between the fingers 5 and 6 when the clip 22 is adjusted on the tongue to properly position the holder on the spoke 2 and when the catch 18 on the tongue is brought to engage with the plate 3 as heretofore described the device is sustained as a rigid and what may be termed unitary structure.

Also it will be apparent that when the device is in applied position it is rigidly supported on the spoke, is not susceptible to vibration and can only be removed by the unbending of the latch end of the tongue.

Having described the invention, I claim:

1. A device for holding watches, comprising two plates arranged one over the other, and each plate having fingers to engage with the periphery of the watch, and spring means for sliding the plates to bring the fingers thereon toward each other and said spring means exerting a tension for forcing the plates toward each other.

2. A device for holding watches, comprising a fixed plate and a slidable plate guided for movement on the fixed plate, said fixed and slidable plates having their outer corners struck at curvatures and formed with inwardly directed overlying fingers to engage the periphery of a watch therebetween, guide means carried by the slidable plate and engaging the fixed plate, spring means for imparting a sliding movement to the slidable plate to bring the fingers thereon toward the fingers of the fixed plate and said spring means also urging the slidable plate against the fixed plate.

3. A device for holding watches, comprising a fixed plate and a slidable plate arranged on the fixed plate, both of said plates having their outer corners struck at curvatures and formed with inwardly directed padded fingers to receive therebetween the periphery of the watch, said slidable plate having its edge, at its straight end, formed with extensions which are bent under the fixed plate to afford guides, said slidable plate having a rearwardly directed eye and the fixed plate having an elongated opening to receive the eye therethrough and a wire spring carried by the fixed plate and having a rounded portion that terminates in a straight end which is passed through the eye and which bridges the opening and exerts an outward tension to cause the sliding of the slidable plate over the fixed plate and to likewise urge the slidable plate against the fixed plate.

4. A device according to claim 2 in which the fixed plate is formed with the underlying tongue having a catch to engage with the fixed plate and provided with a clip for clamping the holder on the spoke of the steering wheel of an automobile.

5. A device according to claim 4 in which the tongue is notched to afford angularly opposed parallel shoulders to be contacted by the clip.

6. A device for holding watches on a spoke of a steering wheel of an automobile, comprising spring influenced slidably associated plates carrying gripping fingers to engage with the periphery of a watch, an underlying tongue carried by one of the plates and having its free end provided with a spring tongue to engage said plate, said tongue being formed with oppositely arranged substantially W-shaped notches from the edges thereof, and their diagonally opposed angle walls afforded by said notches being parallel with each other, and a split spring clip arranged over the tongue and to contact with two of such parallel walls or between such walls and to be arranged around and secured to the spoke of the wheel, for the purpose set forth.

GEORGE F. STACK.